United States Patent [19]
Hatch et al.

[11] Patent Number: 5,384,621
[45] Date of Patent: Jan. 24, 1995

[54] DOCUMENT DETECTION APPARATUS

[75] Inventors: Gilbert J. Hatch, Rochester; Michael A. Parisi, Fairport, both of N.Y.

[73] Assignee: Xerox Corporation, Stamford, Conn.

[21] Appl. No.: 177,348

[22] Filed: Jan. 4, 1994

[51] Int. Cl.6 .......................................... G03G 15/00
[52] U.S. Cl. .................................. 355/204; 355/218; 355/230; 355/75; 358/488
[58] Field of Search ................. 355/230, 218, 75, 208, 355/204, 203; 358/488

[56] References Cited

U.S. PATENT DOCUMENTS

| | | | |
|---|---|---|---|
| 4,194,221 | 3/1980 | Stoffel | 358/283 |
| 4,314,159 | 2/1982 | Davis | 250/561 |
| 4,415,261 | 11/1983 | Yukawa et al. | 355/75 |
| 4,464,681 | 8/1984 | Jacobs et al. | 358/285 |
| 4,605,970 | 8/1986 | Hawkins | 358/265 |
| 4,641,357 | 2/1987 | Satoh | 382/61 |
| 4,713,550 | 12/1987 | Anzai et al. | 250/560 |
| 4,749,872 | 6/1988 | Asada et al. | 250/578 |
| 5,017,963 | 5/1991 | Tuhro | 355/218 |

FOREIGN PATENT DOCUMENTS

| | | | |
|---|---|---|---|
| 0189529 | 8/1986 | Japan | 355/75 |
| 0282238 | 11/1990 | Japan | 355/75 |

*Primary Examiner*—Matthew S. Smith

[57] ABSTRACT

A scanning background member is provided with two or more superimposed line sets or density patterns of having frequencies unrelated to each other that can be detected by a background detection circuit of a document scanner. The multifrequency edge detection arrangement may also control various image movement and modification features that CCD or full-width array sensors may be used to produce accurate edge detection with minimum processing hardware. Detection of differing frequency density patterns or line sets on the scanning background permits the scanner to precisely determine the edges and cutout areas of a scanned original sheet, while employing minimized hardware and software processing requirements. Frequency-related or other edge detection errors that may result from image patterns, moire effects or other inherent, problematic or random sheet/image conditions may be greatly reduced if not eliminated. The edge detection system of the present invention offers improved performance over repetitive symbol and other scanning background schemes which may require greater processing hardware and software while suffering from lower edge resolution and/or higher edge detection error probabilities.

14 Claims, 6 Drawing Sheets

DOCUMENT DETECTION APPARATUS

The present invention relates to a system for detecting a sheet and its edges with a scanner and more particularly to a scanning apparatus for detecting sheet edges and cutout areas having a background member with two or more superimposed density patterns of harmonically unrelated detection frequencies.

In electronic reprographic printing systems, a document or series of documents may be successively scanned with a mechanism that focuses selected portions of the document upon photosensitive cells (such as CCD arrays, full-width arrays and the like) which generate electrical signals related to the light level and/or colors falling upon the cells. Upon scanning of the documents, image signals are obtained and may be electronically stored in memory or processed for printing. These signals may subsequently be read out successively and transferred to a printer for formation of the images on paper. Once a document is scanned, it can be printed any number of times or processed in any number of ways (e.g., words deleted or added, image moved, magnified or reduced, edges, colors or contrast changed, etc.). The processing or manipulation of multiple scanned documents can also include deletion of one or more documents or document areas, reordering of the documents, or addition of previously or subsequently scanned documents. Document printing or processing can be relatively synchronous with scanning, or asynchronous after scanning.

When scanning an original document, it is often desirable to determine the precise exterior edges and cutout areas of the document relative to the scanning background. Background detection/deletion can be used to minimize the space required to store and/or process a digitized document, to resize a document or image, or many other purposes. A desirable scanning background detection scheme should be useful to reduce or eliminate copy or edge effects. Known scanning backgrounds have been provided with colors, repetitive symbols, letters and various other alternatives. While such scanning backgrounds may be somewhat effective, each may suffer from a variety of problems including that certain documents may include image features that are not always distinguishable from the platen background.

Various approaches have been employed to scan documents, to include those taught by the following disclosures that may be relevant:

U.S. Pat. No. 5,017,963
Issued: May 21, 1991
Patentee: Tuhro
U.S. Pat. No. 4,749,872
Issued: Jun. 7, 1988
Patentee: Asada et al.
U.S. Pat. No. 4,713,550
Issued: Dec. 15, 1987
Patentee: Anzai et al.
U.S. Pat. No. 4,641,357
Issued Feb. 3, 1987
Patentee: Satoh
U.S. Pat. No. 4,605,970
Issued: Aug. 12, 1986
Patentee: Hawkins
U.S. Pat. No. 4,464,681
Issued: Aug. 7, 1984
Patentee: Jacobs et al.
U.S. Pat. No. 4,415,216
Issued: Nov. 15, 1983
Patentee: Yukawa et al.
U.S. Pat. No. 4,314,159
Issued: Feb. 2, 1982
Patentee: Davis
U.S. Pat. No. 4,194,221
Issued: Mar. 18, 1980
Patentee: Stoffel U.S. Pat. No. 5,017,963 to Tuhro discloses a document background member is provided with a distinctive background patterning including image data of a selected frequency, that the background can .be detected by an image frequency detection circuit. Detection or non-detection of the distinctive patterning thereby enables determination of edges of a scanned original. An edge sensing arrangement may be provided with a distinctive background patterning against which the image is illuminated to provide an electronically detectable and clear delineation between document and background for the purpose of edge detection. The edge detection arrangement may also control various erasure arrangements that erase the detectable patterning, to prevent it from showing up in the image. A sensor may be fabricated to produce a strong detectable beating pattern when used against selected background patternings.

U.S. Pat. No. 4,749,872 to Asada et al. provides a target for reference of home positions in a document scan apparatus. A reference position marker is mounted on the document support table which directly reflects light from a document illumination light source into an optical sensor array through a mirror and a lens which causes the array to operate in a saturated range to generate a higher output signal level than an expected highest signal level of the sensor array.

U.S. Pat. No. 4,713,550 to Anzai et al. teaches a document size detection apparatus having a plurality of sensor portions including light emitting devices and photodetector devices disposed in the vicinity of an original table for detecting the size of a document such as an original mounted on the original table is disclosed. The device uses reflected light or transmitted light, a comparator for comparing the output level of the sensor portion with a reference level, and decision means for deciding the document size depending on the output signal of the comparator. The document size detection apparatus comprises a circuit for changing the reference level of the comparator and for detecting the resultant output of the comparator in order to find the condition in which the reference level becomes equal to the output level of the sensor portion and a storage circuit for storing the value representing that condition, which are used in the adjustment mode without a document mounted on the original table, and a reference level setting circuit for setting the reference level to be input to the comparator depending on the value stored in the storage circuit, which is used in the document size decision mode for detecting the size of a document mounted on the table.

U.S. Pat. No. 4,641,357 to Satoh discloses an apparatus for scanning a document image wherein a single reference strip is provided along the side of a moving platen. The reference strip comprises a pattern of optically scannable reference lines inclined at a 45° angle with respect to the CCD and the platen. An analyze circuit is provided for determining whether a right edge of a black stripe of the lines is at a detect position in which case image data of the respective line is gated to a buffer memory of an image process circuit and the detect position is shifted to the next picture element position. If the condition is not satisfied, the image data is discarded (not supplied to the buffer memory) and the detect position is unchanged. Using the stripe pattern of lines, the system is effectively rendered insensitive to interruptions of document motion and/or variations in document motion speed.

U.S. Pat. No. 4,605,970 to Hawkins discloses a diagnostic tool for calibrating an optical document digitizer, comprising a strip composed of an optical pattern of contrasting light and dark areas on one surface thereof. Such strips or ladder charts provide a crude method of determining the position of the document being scanned. A number of scanning lines must be read in order to determine location.

U.S. Pat. No. 4,464,681 to Jacobs et al discloses a method and apparatus for adjusting a facsimile document scanner in which a test pattern is used to adjust the facsimile. In particular, a test pattern is printed on a piece of paper which is adhered to the inside of the facsimile for calibrating the facsimile. When the image of the test pattern is the same size as the photodiode array and when the image is precisely focused upon the photodiode array, the dark and light image stripes of the pattern fall exactly upon alternate photocells of the photodiode array.

U.S. Pat. No. 4,415,216 to Yukawa et al. discloses an improved platen cover for overlying original documents disposed atop a transparent plate for optical scanning in a copying machine includes marks or patterns on its surface facing the transparent plate. The marks or patterns are placed on the platen cover surface utilizing a fluorescent paint so that the marks or patterns do not reproduce on or degrade the quality of the copy of the original document operatively produced by the machine.

U.S. Pat. No. 4,314,159 to Davis teaches a scanner for scanning a document positioned against a backing surface to determine the position of the document includes photoelectric transduces which provide electrical scan signals in dependence upon the light reflected from the document and from the backing surface at a plurality of moving scan positions as the scan positions move across both the document and the backing surface. A recognizable background image is defined on the document backing surface such that the document backing surface is scanned, thereby indicating the position of the document. The recognizable background pattern may include a plurality of stripes on the document backing surface with the stripes extending substantially parallel to the direction of movement of the scan positions. Alternatively, the recognizable background pattern may include a plurality of stripes which extend substantially perpendicular to the direction of movement of the scan positions. Alternate ones of the stripes may be black with intermediate ones of the stripes being white. A circuit means may be provided for detecting the recognizable pattern of the scan signals.

U.S. Pat. No. 4,194,221 to Stoffel discloses the application of a distinguishing or discriminating function. Detection or non-detection of the distinctive background pattern enables determination of edges of a scanned original.

According to one aspect of the present invention, there is provided an apparatus for detecting the location of a sheet. The apparatus includes a platen for supporting the sheet and providing a backing for scanning the sheet. The platen includes a first optically detectable pattern having a first predetermined frequency and a second optically detectable pattern superimposed thereon, having a second predetermined frequency, with the first predetermined frequency being harmonically unrelated to said second predetermined frequency. The apparatus also includes a sensor, in communication with the platen, for providing data indicative of the sheet, the first optically detectable pattern and the second optically detectable pattern. A means for producing relative movement between the sensor and the sheet is also included. The apparatus also includes a processor, in communication with the sensor, for discriminating the first optically detectable pattern and second optically detectable patterns on the platen backing surface from the sheet according to the data from the sensor so as to determine the location of the sheet on the platen.

According to another aspect of the present invention, there is provided a printing machine having an apparatus for detecting the location of a sheet. The apparatus includes a platen for supporting the sheet and providing a backing for scanning the sheet. The platen includes a first optically detectable pattern having a first predetermined frequency and a second optically detectable pattern superimposed thereon, having a second predetermined frequency, with the first predetermined frequency being harmonically unrelated to said second predetermined frequency. The apparatus also includes a sensor, in communication with the platen, for providing data indicative of the sheet, the first optically detectable pattern and the second optically detectable pattern. A means for producing relative movement between the sensor and the sheet is also included. The apparatus also includes a processor, in communication with the sensor, for discriminating the first optically detectable pattern and second optically detectable patterns on the platen backing surface from the sheet according to the data from the sensor so as to determine the location of the sheet on the platen.

The present invention will be described in detail with reference to the following drawings, in which like reference numerals are used to refer to like elements. The various aspects of the present invention will become apparent as the following description proceeds and upon reference to the drawings, in which.

While the present invention will hereinafter be described in connection with preferred embodiments, it will be understood that it is not intended to limit the invention to a particular embodiment. On the contrary, it is intended to cover all alternatives, modifications and equivalents as may be included within the spirit and scope of the invention as defined by the appended claims.

For a general understanding of the features of the present invention, reference is made to the drawings. In the drawings, like reference numerals have been used throughout to designate like elements. It will become evident from the following discussion that the present invention and the various embodiments set forth herein are suited for use in a wide variety of printing and copying systems, and are not necessarily limited in its application to the particular systems shown herein.

Figure 5:
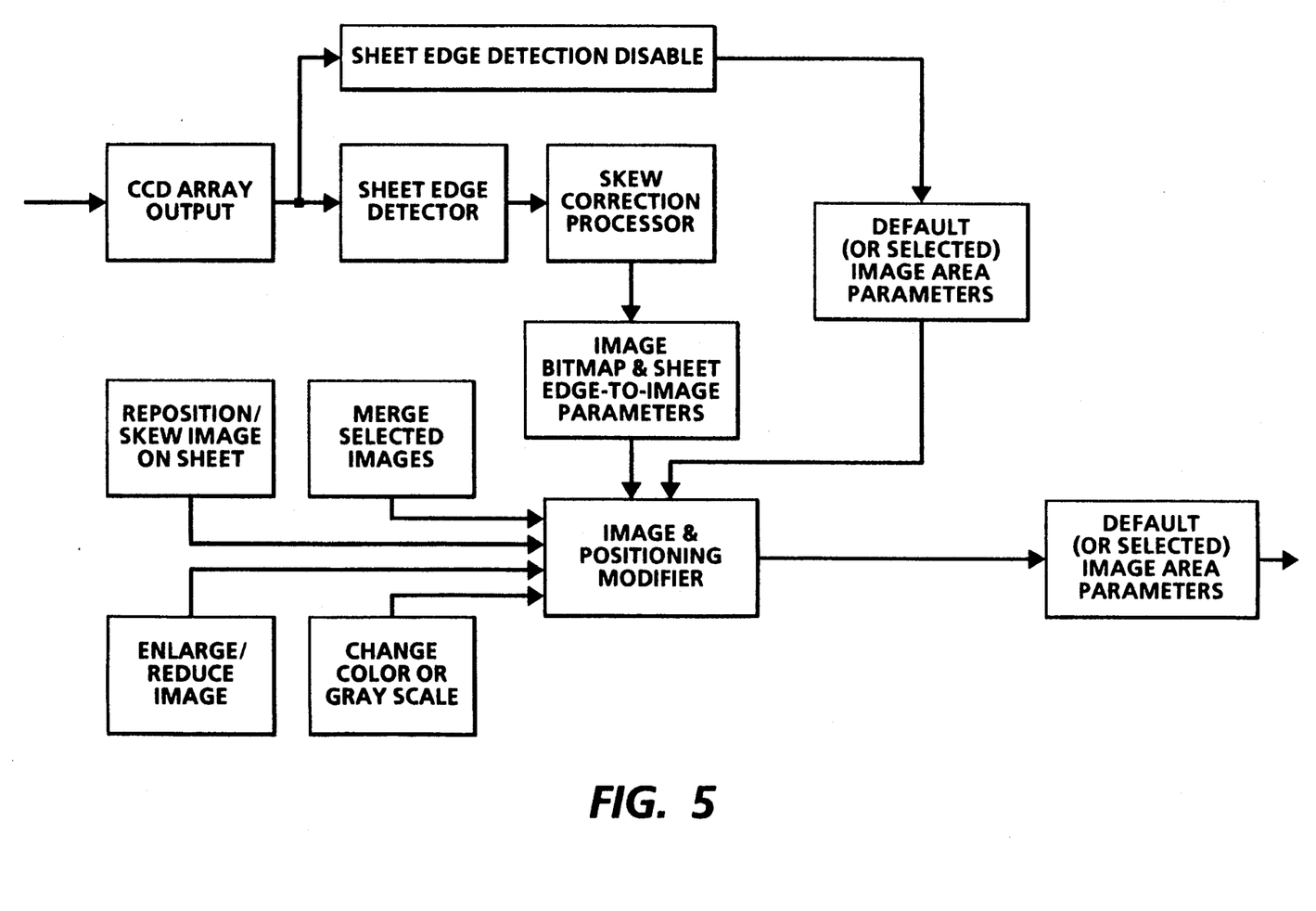
FIG. 5 is a block diagram showing further sheet edge and image modification processor features of an embodiment of the present invention.
Figure 6:
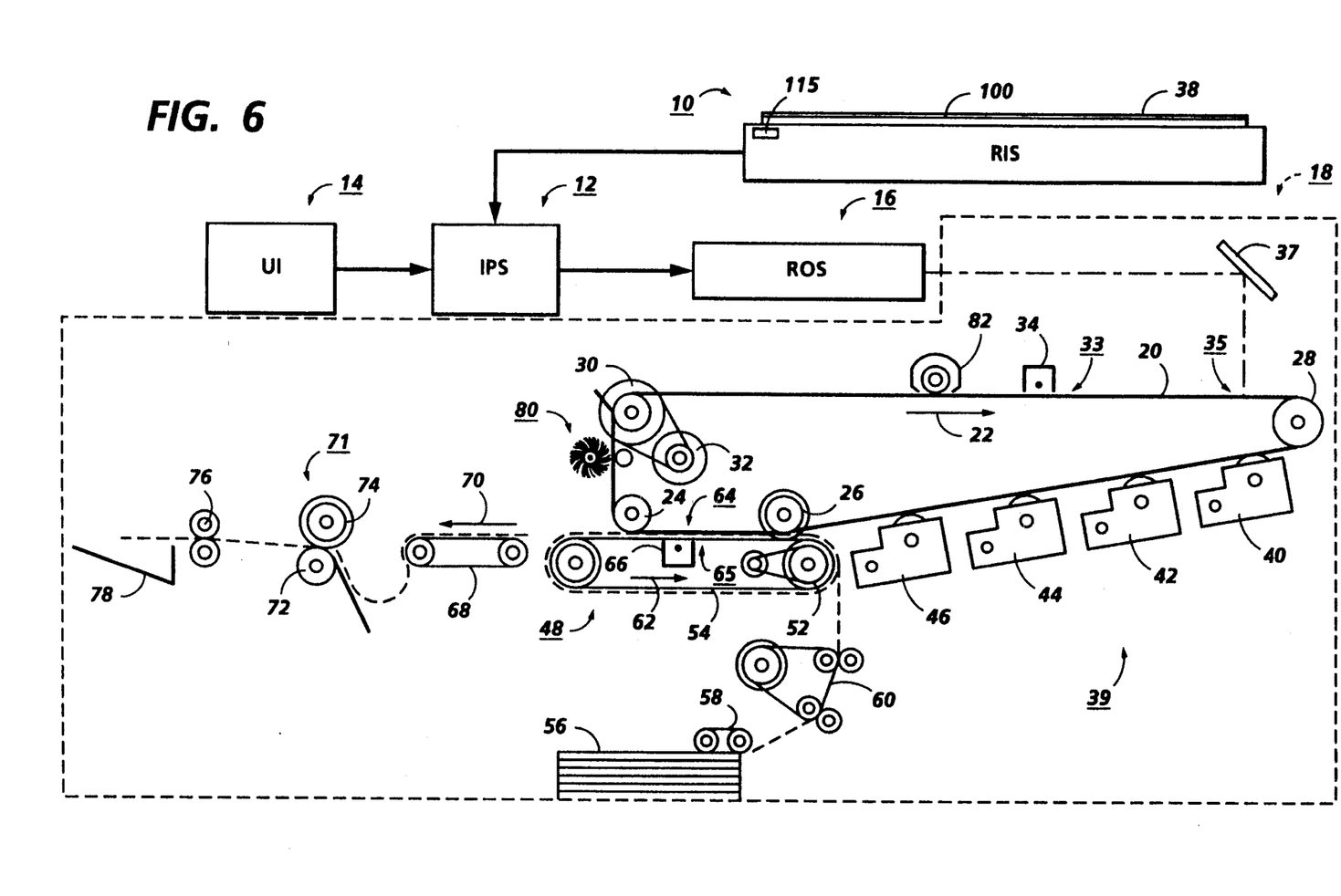
FIG. 6 is a schematic elevational view showing an exemplary electrophotographic printing machine which may incorporate the features of the present invention therein.

To begin by way of general explanation, FIG. 6 is a schematic elevational view showing an electrophotographic printing machine which may incorporate features of the present invention therein. It will become evident from the following discussion that the present invention is equally well suited for use in a wide variety of copying and printing systems, and is not necessarily limited in its application to the particular system shown herein. As shown in FIG. 6, during operation of the printing system, a multiple color original document is positioned on a raster input scanner (RIS), indicated generally by the reference numeral 10. The RIS contains document illumination lamps, optics, a mechanical scanning drive, and a charge coupled device (CCD) array scanner bar 115. A document (not shown) may be placed manually (or with a mechanized document feeder, also not shown) between scanner platen backing 100 on RIS cover 38 and CCD array scanner bar 115. The RIS captures the entire image from original document 38 and converts it to a series of raster scan lines and moreover measures a set of primary color densities, i.e. red, green and blue densities, at each point of the original document. This information is transmitted as electrical signals to an image processing system (IPS), indicated generally by the reference numeral 12. IPS 12 converts the scanned set of red, green and blue density signals to a set of colorimetric coordinates. The IPS or processor may also detect the background on platen backing 100 so as to determine edge and cutout area information, as described in detail in association with FIGS. 1 through 5 herein.

The IPS contains control electronics which prepare and manage the image data flow to a raster output scanner (ROS), indicated generally by the reference numeral 16. A user interface (UI), indicated generally by the reference numeral 14, is in communication with IPS 12. UI 14 enables an operator to control the various operator adjustable functions. The operator actuates the appropriate keys of UI 14 to adjust the parameters of the copy. UI 14 may be a touch screen, or any other suitable control panel, providing an operator interface with the system. The output signal from UI 14 is transmitted to IPS 12. The IPS uses the red, green and blue densities from RIS 10 to calculate cyan, magenta, yellow and black toner densities; the IPS then transmits signals with these densities corresponding to the desired image to ROS 16, which creates the output copy image.

ROS 16 includes a laser with rotating-polygon mirror blocks. The ROS illuminates, via mirror 37, the charged portion of a photoconductive belt 20 of a printer or marking engine, indicated generally by the reference numeral 18, at a rate of about 400 pixels per inch, to achieve a set of subtractive primary latent images. The ROS will expose the photoconductive belt to record four latent images which correspond to the signals transmitted from IPS 12. One latent image is developed with cyan developer material; a second latent image is developed with a magenta developer material; a the third latent image is developed with yellow developer material; and a forth latent image is developed with a black developer material. These developed images are transferred to a copy sheet in superimposed registration with one another to form a multicolored image on the copy sheet. This multicolored image is then fused to the copy sheet forming a color copy.

With continued reference to FIG. 6, printer or marking engine 18 is an electrophotographic printing machine. Photoconductive belt 20 of marking engine 18 is preferably made from a polychromatic photoconductive material. The photoconductive belt moves in the direction of arrow 22 to advance successive portions of the photoconductive surface sequentially through the various processing stations disposed about the path of movement thereof. Photoconductive belt 20 is entrained about transfer rollers 24 and 26, tensioning roller 28, and drive roller 30. Drive roller 30 is rotated by a motor 32 coupled thereto by suitable means such as a belt drive. As roller 30 rotates, it advances belt 20 in the direction of arrow 22.

Initially, a portion of photoconductive belt 20 passes through a charging station, indicated generally by the reference numeral 33. At charging station 33, a corona generating device 34 charges photoconductive belt 20 to a relatively high, substantially uniform potential.

Next, the charged photoconductive surface is rotated to an exposure station, indicated generally by the reference numeral 35. Exposure station 35 receives a modulated light beam corresponding to information derived by RIS 10 having multicolored original document 38 positioned thereat. The modulated light beam impinges on the surface of photoconductive belt 20. The beam illuminates the charged portion of the photoconductive belt to form an electrostatic latent image. The photoconductive belt is exposed three times to record three latent images thereon.

After the electrostatic latent images have been recorded on photoconductive belt 20, the belt advances such latent images to a development station, indicated generally by the reference numeral 39. The development station includes four individual developer units indicated by reference numerals 40, 42, 44 and 46. The developer units are of a type generally referred to in the art as "magnetic brush development units." Typically, a magnetic brush development system employs a magnetizable developer material including magnetic carrier granules having toner particles adhering triboelectrically thereto. The developer material is continually brought through a directional flux field to form a brush of developer material. The developer material is constantly moving so as to continually provide the brush with fresh developer material. Development is achieved by bringing the brush of developer material into contact with the photoconductive surface. Developer units 40, 42, and 44, respectively, apply toner particles of a specific color which corresponds to the compliment of the specific color separated electrostatic latent image recorded on the photoconductive surface.

The color of each of the toner particles is adapted to absorb light within a preselected spectral region of the electromagnetic wave spectrum. For example, an electrostatic latent image formed by discharging the portions of charge on the photoconductive belt corresponding to the green regions of the original document will record the red and blue portions as areas of relatively high charge density on photoconductive belt 20, while the green areas will be reduced to a voltage level ineffective for development. The charged areas are then made visible by having developer unit 40 apply green absorbing (magenta) toner particles onto the electrostatic latent image recorded on photoconductive belt 20. Similarly, a blue separation is developed by developer unit 42 with blue absorbing (yellow) toner particles, while the red separation is developed by developer unit 44 with red absorbing (cyan) toner particles. Developer unit 46 contains black toner particles and may be used to develop the electrostatic latent image formed from a black and white original document. Each of the developer units is moved into and out of an operative position. In the operative position, the magnetic brush is substantially adjacent the photoconductive belt, while in the nonoperative position, the magnetic brush is spaced therefrom. During development of each electrostatic latent image, only one developer unit is in the operative position, the remaining developer units are in the nonoperative position. This insures that each electrostatic latent image is developed with toner particles of the appropriate color without commingling.

After development, the toner image is moved to a transfer station, indicated generally by the reference numeral 65. Transfer station 65 includes a transfer zone, generally indicated by reference numeral 64. In transfer zone 64, the toner image is transferred to a sheet of support material, such as plain paper amongst others. At transfer station 65, a sheet transport apparatus, indicated generally by the reference numeral 48, moves the sheet into contact with photoconductive belt 20. Sheet transport 48 has a pair of spaced belts 54 entrained about a pair of substantially cylindrical rollers; one roller (52) may supply movement power to belts 54. A sheet gripper 84 (not shown in FIG. 6) extends between belts 54 and moves in unison therewith. A sheet 25 (not shown) is advanced from a stack of sheets 56 disposed on a tray. A friction retard feeder 58 advances the uppermost sheet from stack 56 onto a pre,transfer transport 60. Transport 60 advances sheet 25 (not shown in FIG. 6) to sheet transport 48. Sheet 25 is advanced by transport 60 in synchronism with the movement of the sheet gripper. In this way, the leading edge of sheet 25 arrives at a preselected position, i.e. a loading zone, to be received by the open sheet gripper. The sheet gripper then closes securing sheet 25 thereto for movement therewith in a recirculating path. The leading edge of sheet 25 is secured releasably by the sheet gripper. As belts 54 move in the direction of arrow 62, the sheet moves into contact with the photoconductive belt, in synchronism with the toner image developed thereon. In transfer zone 64, a corona generating device 66 sprays ions onto the backside of the sheet so as to charge the sheet to the proper magnitude and polarity for attracting the toner image from photoconductive belt 20 thereto. The sheet remains secured to the sheet gripper so as to move in a recirculating path for three cycles. In this way, three different color toner images are transferred to the sheet in superimposed registration with one another.

One skilled in the art will appreciate that the sheet may move in a recirculating path for four cycles when under color black removal is used. Each of the electrostatic latent images recorded on the photoconductive surface is developed with the appropriately colored toner and transferred, in superimposed registration with one another, to the sheet to form the multicolor copy of the colored original document.

After the last transfer operation, the sheet transport system directs the sheet to a vacuum conveyor 68. Vacuum conveyor 68 transports the sheet, in the direction of arrow 70, to a fusing station, indicated generally by the reference numeral 71, where the transferred toner image is permanently fused to the sheet. The fusing station includes a heated fuser roll 74 and a pressure roll 72. The sheet passes through the nip defined by fuser roll 74 and pressure roll 72. The toner image contacts fuser roll 74 so as to be affixed to the sheet. Thereafter, the sheet is advanced by a pair of rolls 76 to a catch tray 78 for subsequent removal therefrom by the machine operator.

The final processing station in the direction of movement of belt 20, as indicated by arrow 22, is a photoreceptor cleaning apparatus, indicated generally by the reference numeral 80. A rotatably mounted fibrous brush may be positioned in the cleaning station and maintained in contact with photoconductive belt 20 to remove residual toner particles remaining after the transfer operation. Thereafter, lamp 82 illuminates photoconductive belt 20 to remove any residual charge remaining thereon prior to the start of the next successive cycle.

Figure 1:
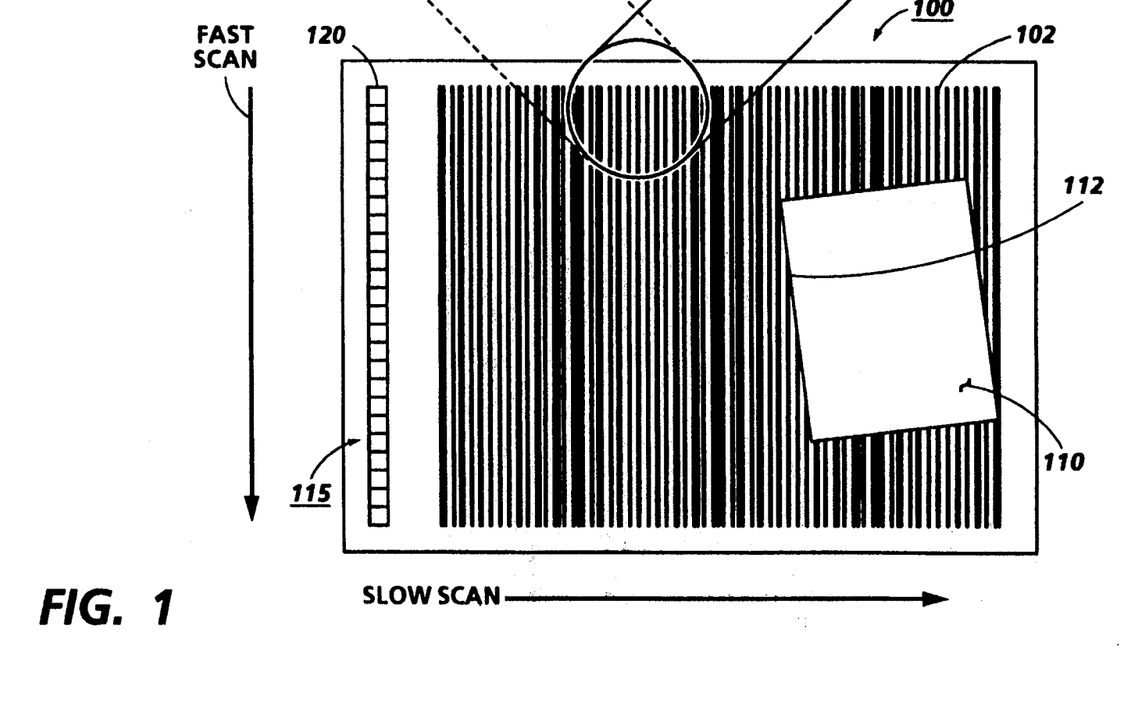
FIG. 1 is a partial schematic view of the document scanner platen background assembly of the present invention.
Figure 1A:
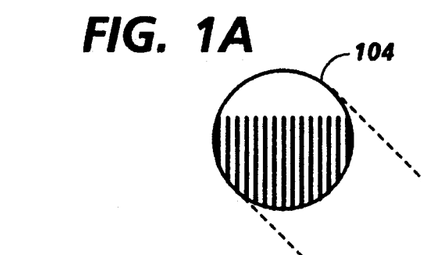
Figure 1B:
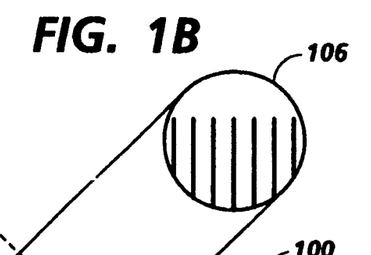

FIG. 1 shows a platen backing 100 with a density modulated platen backing surface 102. Two harmonically unrelated frequency line sets 104 and 106 are superimposed onto the scanning background of platen 100. Line sets 104 and 106 are shown running parallel to the fast scan direction arrow as shown, although line sets running in other directions or other unrelated modulating frequency schemes may also be employed. Superimposed unrelated frequency line sets 104 and 106 are shown greatly enlarged in FIG. 1 for purposes of illustration, as are the individual CCDs 120 of CCD array 115, which might typically include 4000 CCD's ten inch wide CCD field of view in array 115 at 400 spots per inch (or a total of 12,000 filtered sensors when color scanning/printing is performed as described above in association with FIG. 6). Line sets 104 and 106 as shown on the background surface of platen 100 of an actual embodiment of the present invention may, for example, be between one half to ten or pixels in width, so as to be closely spaced yet compatible resolution of the scanner; the backgrounds taught by U.S. Pat. Nos. 5,017,963, 4,641,357, and 4,415,216 (previously discussed) give no indication of approaching this level of sheet edge resolution with the accuracy of the present detection system. The use of two or more unrelated frequencies in the selected line sets or density patterns virtually eliminates the possibility of accidental detection of an image within the document, whereas other systems recognize that backgrounds with repetitive markings such as letters, symbols, patterns or other schemes can give an incorrect edge and area readings when the document contains such markings, particularly when the markings are near an edge. Detection of cutout areas of documents scanned against such backgrounds can also leads to detection errors, when such markings appearing anywhere on the document can lead to detection error.

At the same time, the use of multiple spatially compact single dimensional unrelated detection frequencies can reduce edge address processing time as well as processor capacity and hardware requirements. As CCD array 115 or a full-width array scans the platen background field of view for areas of the document (those areas not containing both unique densities or frequencies present on the platen background), the precise edges and areas of the document are accurately identified. Once each relevant electronic edge address is identified, the background area can be suppressed and its pattern ignored. The edge address may be stored in abbreviated form, temporarily for copying of the scanned document, or by a more permanent computer memory if the image and sheet edge location are to be retained. No bitmapping of off background areas is required or performed once the scanning processor recognizes the platen background. Processing of the high resolution/spatially compact unrelated frequency background line sets or density patterns of the present invention is therefore more rapid and dependable than large patterned/less compact scanner background patterns.

The present document/edge detection arrangement may also assist in the control of various document image movement and modification features. Detection of the differing frequency density patterns on the scanning background member permits the scanner to precisely determine the edges and cutout areas of a scanned original sheet, while employing minimized hardware and software processing requirements. Frequency-related or affected edge detection errors that may result from patterns within the image, moire effects or other inherent, problematic or random sheet/image conditions may be greatly reduced if not eliminated according to the present invention, in contrast to repetitive patterning or other scanning background schemes which may suffer from higher edge detection error probabilities.

As shown in FIG. 1, sheet 110 has a leading edge 112 that is not aligned relative to CCD array 115 or the fast scan direction of that array. Upon scanning by CCD array 115, a document edge discriminator processor recognizes the presence of the frequency of the platen background not covered by the sheet; the high resolution multiple frequency edge detection capability of the present invention prevents any markings at or near the edge of sheet 110 from being mistaken for the edge of the sheet. The platen background of the present invention enables sheet edge discrimination at a higher order, unlike platen background systems having only lower order repeating or uniformly spaced symbols or patterns of a single frequency or at harmonic or related frequencies. Systems using such lower order symbols or patterns can result in incorrect and imprecise edge detection, particularly when a portion of the image to be scanned coincidentally imitates or approximates that lower order symbol or pattern, by the occurrence of forms within the image itself, by imaging aspects such as half-tone, gray scale, color and/or image density, or by other unpredictable image scanning effects.

In addition to the occurrence of accidental or unpredictable image scanning effects, there are situations with known scanning background systems in which an already reproduced document (second or greater generation copy) is made against the same a lower order patterned platen backing such that a scanner may pick up some portion of that pattern now found on the sheet itself. In this manner, the scanner may mistake a portion of the document as a cutout area or edge. The background line sets and density patterns of the present invention permit the scanner to locate the document with improved precision; automatic high resolution trimming or "cropping" of the field of view is accomplished such that only image of the document is stored. The use of at least one set of markings on the platen background that exceed the resolution of a document that can be made from the scanned document (and platen background) can further reduce any possibility that false edge information might be reproduced so as to introduce sheet edge detection error in a second generation document. The compacted line set/pattern information of the present invention can also result in improved image-to-page centering, image enlargement and/or other desired image modifications to the digitally retained document image. Sheet edge shadows and other "edge of page effects" may also be greatly reduced or eliminated.

In one embodiment of the present invention, platen background 100 modulated by two line sets or density patterns having density modulation functions of different sinusoidal frequencies. The output of each cell 120 of the CCD output is provided to a digital filter-detector such that the detectors output will indicate the presence or lack of the platen back density modulation frequencies so as to indicate the presence of the document. FIG. 3C shows a representative plot of density modulations ($PD_{x_n}$) as may appear at a points $x_n$ accross a single fast scan of a 10½ inch wide a platen background having lines sets modulated parallel to a slow scan direction. Other schemes involving multiple unrelated density modulations, patterns (colors, spots, or other spatially compact configurations) superimposed on the scanning background of platen 100 and detectable by a processor filter system may also provide desirable document cutout area and edge detection. Such background pattern schemes are also possible and included within the the scope of the present invention. When rapid fast scan direction document detection is desired, the density modulation may be aligned so as to run parallel with the slow scan direction arrow shown in FIG. 1 (rather than parallel with the fast scan direction, as shown) or otherwise recognizable during a single pass or scan in the fast scan direction, so as to permit one dimensional sensing of the platen background.

Figure 2:
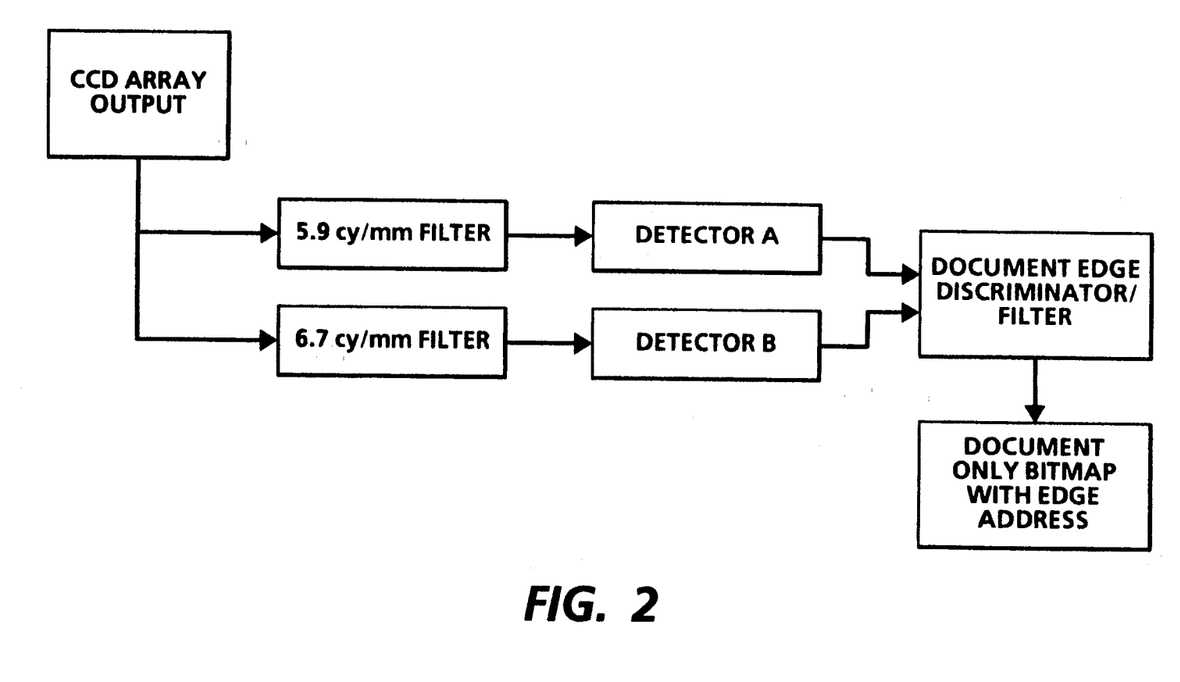
FIG. 2 is a block diagram of a document detection processing system of the present invention.

FIG. 2 shows a schematic block diagram of detectors of the edge detection circuitry of the present invention. Each CCD 120 output contains information from the platen backing or from the document which is output to at least two filters. For example, in the embodiment described shown in FIG. 2, a CCD array provides sensing output to a pair of filters; one filter may have center frequency equivalent to 5.9 cycles per mm, while the other filter may have center frequency equivalent to 6.7 cycles per mm. Detector A outputs a response indicating when the 5.9 cycles per mm frequency is detected; detector B outputs a response indicating when the 6.7 cycles per mm frequency is detected. When both frequencies are detected, the presence of the platen background assumed according to the document edge discriminator/filter. When both detected frequencies are not simultaneously present, a no "platen background present" indication output signal results. The CCD array may thus locate the edges of the platen background in its path so as to enable complete and accurate digital outlining of the scanned document, regardless of its contents. Each CCD cell (monochrome or three filter/color) may be connected to feed data to a single filter-detector set as shown in FIG. 2 so as to accurately discriminate an original document from the platen background. As a result, only the document bitmap and edge address locations are retained, while platen backing detections are suppressed.

As set forth above, the platen background of the present invention employs multiple density modulation patterns with harmonically unrelated frequencies. The modulation frequencies must be high enough to allow adequate resolution in accurately locating the document, yet low enough to allow the CCD array to optically resolve the modulation frequencies. The frequencies must also be low enough to be below the Nyquist frequency level of the CCD array sampling rate to assure that the CCD sample outputs contain the correct modulation frequencies that are to be detected. The modulation frequencies are selected so as to lower the possibility that the set of frequencies might occur simultaneously in the image of the document being scanned. Depending on the CCD or full-width array to be employed, the optical resolution of the array must exceed that which is required to read the frequency of the line sets and/or density patterns on the platen background.

The optical resolution of the array may exceed the resolution of the stored or printed document image. In one embodiment, a 400 spot per inch resolution scanner is employed with a platen background pattern created by modulating 1/800th of an inch wide line sets. Such an fine line sets system can be modulated to result in the required platen background frequencies. When, for example, a Nyquist frequency of the CCD sampling rate is 200 cycles per inch (7.87 cycles/mm), based on a slow scan rate of 400 lines per inch, the scan rate is well below that of the line set frequency yet well above the two selected density modulation frequencies. As such, the selected frequencies described in conjunction with FIG. 2 satisfy the Nyquist requirements and the optical requirements of the image scanning aspects of the scanner.

Figure 3A:
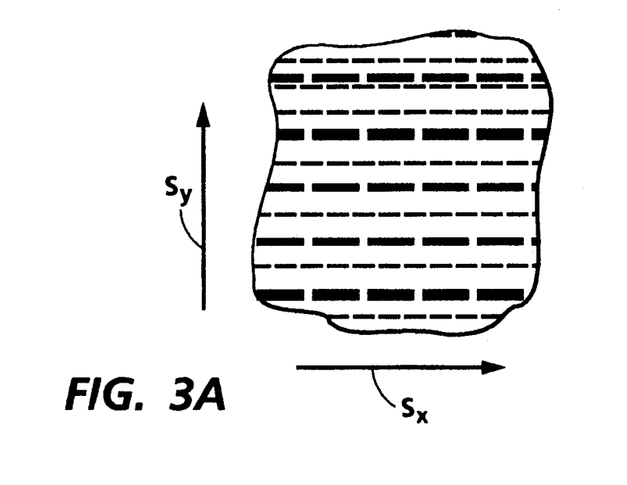
FIG. 3A is a fragmentary elevational view of another embodiment of a scanning background of the present invention.
Figure 3B:
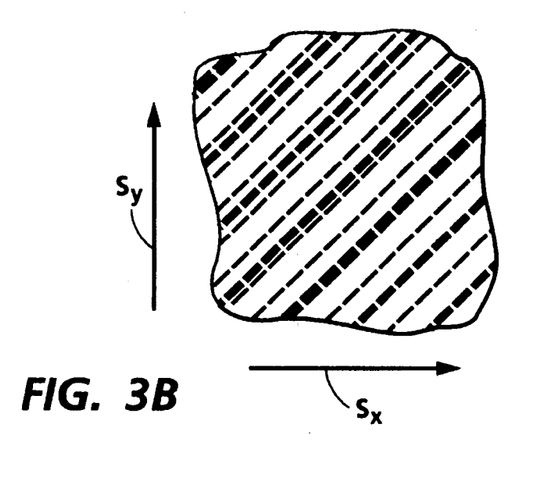
FIG. 3B is a fragmentary elevational view of another embodiment of a scanning background of the present invention.
Figure 3C:
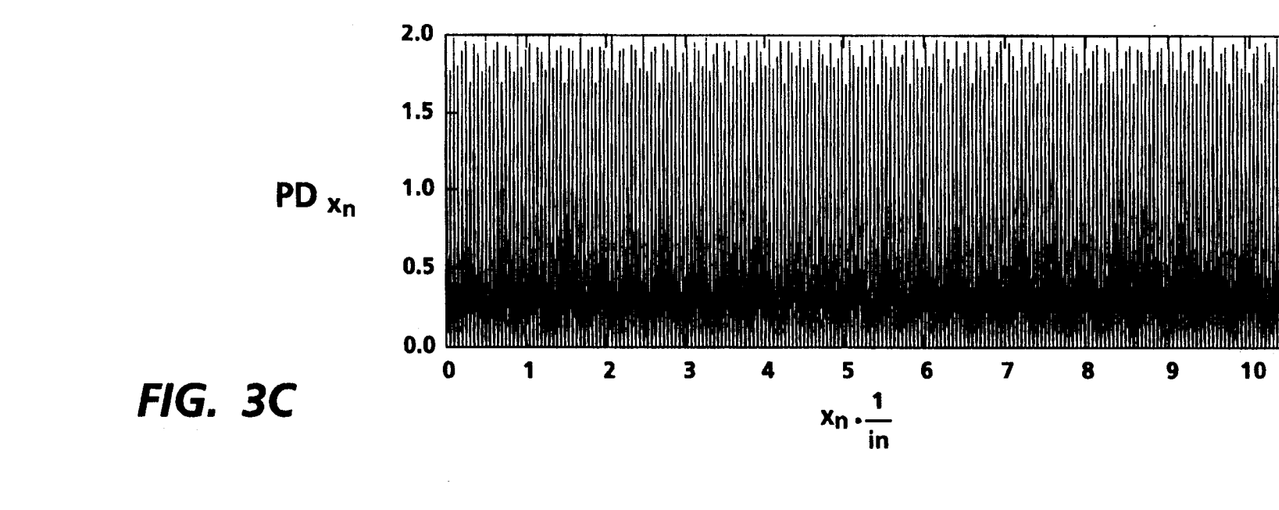
FIG. 3C is a representative graph of density modulations on a platen background in accordance with the present invention.

FIGS. 3A and 3B show enlarged fragmentary views of other platen background 100 configurations that may be employed in the present invention. FIG. 3A shows a array of interrupted line sets generally aligned parallel to the relative to the fast scan direction ($S_x$), rather than in the slow scan direction ($S_y$) such as shown in FIG. 1. High resolution CCD or full-width array sampling can be employed to yield the varied screen frequency parameters described above. The configuration shown in FIG. 3B also employs more than two harmonically unrelated frequencies. FIG. 3B shows a diagonal array of interrupted lines relative to the fast and slow ($S_y$ and $S_x$) scan directions, which by high resolution CCD or full-width array sampling can also be employed to yield the modulation frequency parameters described above. This configuration also employs more than two harmonically unrelated frequencies.

Figure 4:
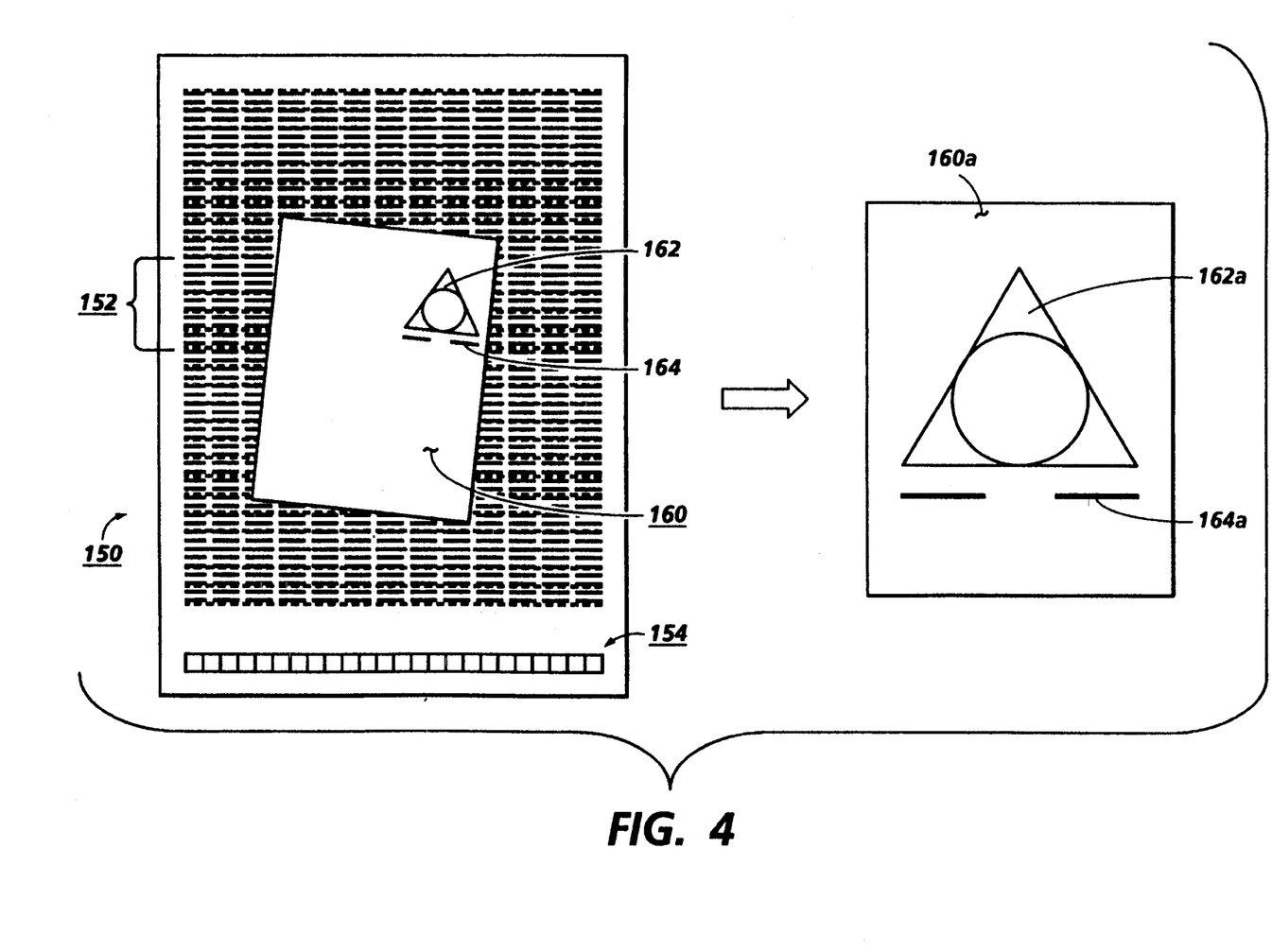
FIG. 4 is an elevational diagram showing skew correction, alignment and image positioning features of the present invention.

FIG. 4 shows an original document, sheet 160, placed on platen backing surface 150, which is not aligned relative to CCD array 154 (or the fast scan direction of that array.) Upon scanning by CCD array 154, a document edge discriminator processor recognizes the density frequencies (repeated many times in a zone 152) of platen backing surface 150 not covered by sheet 160; the high resolution multiple frequency edge detection capability of the present invention prevents any markings at or near the edge of sheet 160 from being mistaken for the edge of the sheet. The platen background of the present invention enables sheet edge discrimination at a higher order, in contrast to platen backgrounds having only lower order repeating or uniformly spaced symbols or patterns. The FIGS. 1, 3A, 3B and 4 platen backgrounds (as well as others described herein) permit the scanner to locate the document with increased precision; automatic high resolution trimming or "cropping" of the field of view may thus be accomplished. As shown in FIG. 4, the markings (image 162 and text 164) on original sheet 160 may also be realigned and resized with great accuracy relative to the sheet edges, so as to result in copy 160a, having accurately repositioned and resized image 162a and text 164b printed thereon.

FIG. 5 shows a block diagram of a processor that may be used to carry out various document reproduction modifications using the edge detection system of the present invention. The CCD array provides the edge detector processor with edge and cutout area information (unless the edge detect processor is disabled). Sheet skew correction of the original document relative to the scanner is performed, and a set of image bitmap and edge-to-image area parameters is generated, according to abbreviated edge edge information provided by the sheet edge detector. The image is accordingly repositioned on the document for reproduction or storage. Various image modifications (such as image merging, further repositioning/skewing, resizing and/or color or gray scale alterations as shown in FIG. 5) may be selected by a user; selected (or default) image and edge parameters are thereafter forwarded for printing, storage or further processing.

While the present invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

We claim:

1. An apparatus for detecting the location of a sheet, comprising:

a platen for supporting the sheet and providing a backing for scanning the sheet, said platen including a first optically detectable pattern having a first predetermined frequency, and a second optically detectable pattern superimposed thereon, having a second predetermined frequency, with the first predetermined frequency being harmonically unrelated to said second predetermined frequency;

a sensor, in communication with said platen, for providing data indicative of the sheet, the first optically detectable pattern and the second optically detectable pattern;

means for producing relative movement between said sheet and said sensor; and a processor, in communication with said sensor, for discriminating the first optically detectable pattern and second optically detectable patterns on said platen backing surface from said sheet according to the data from said sensor so as to determine the location of the sheet on said platen.

2. The apparatus of claim 1, comprising a third optically detectable pattern superimposed on said first optically detectable pattern and second optically detectable pattern on said platen with the third optically detectable pattern having a third predetermined frequency harmonically unrelated to the first predetermined frequency and the second predetermined frequency, respectively, of the first optically detectable pattern and the second optically detectable pattern, whereby said processor discriminates said third optically detectable pattern on said platen from the sheet.

3. The apparatus of claim 1, wherein said sensor comprises an array of charge coupled devices and the data transmitted therefrom includes a first set of sheet image data and a second set of sheet edge data.

4. The apparatus of claim 3, further comprising an image processor for storing the first set of sheet image data and the second set of sheet edge data from said charge coupled devices.

5. The apparatus of claim 3, further comprising a user interface device for modifying the sheet image data and the sheet edge data.

6. The apparatus of claim 1, wherein the first optically detectable pattern comprises a first set of spatially compact parallel lines and wherein the second optically detectable pattern comprises a second set of spatially compact parallel lines.

7. The apparatus of claim 1, wherein said producing means moves said sensor to scan the sheet and said platen in a first direction and a second direction, substantially perpendicular to the first direction.

8. A printing machine having an apparatus for detecting the location of a sheet, comprising:
  a platen for supporting the sheet and providing a backing for a scanning the sheet, said platen including a first optically detectable pattern, having a first predetermined frequency, and a second optically detectable pattern superimposed thereon, having a second predetermined frequency, with the first predetermined frequency being harmonically unrelated to said second predetermined frequency;
  a sensor, in communication with said platen, for providing data indicative of the sheet, and the first optically detectable pattern and the second optically detectable pattern;
  means for producing relative movement between said sheet and said sensor; and
  a processor, in communication with said sensor, for discriminating the first optically detectable pattern and second optically detectable patterns on said platen backing surface from said sheet according to the data from said sensor so as to determine the location of the sheet on said platen.

9. The printing machine of claim 8, comprising a third optically detectable pattern superimposed on said first optically detectable pattern and said second optically detectable pattern on said platen with the third optically detectable pattern having a third predetermined frequency harmonically unrelated to the first predetermined frequency and the second predetermined frequency, respectively, of the first optically detectable pattern and the second optically detectable pattern, whereby said processor discriminates said third optically detectable pattern on said platen from the sheet.

10. The printing machine of claim 8, wherein said sensor comprises an array of charge coupled devices and the data transmitted therefrom includes a first set of sheet image data and a second set of sheet edge data.

11. The printing machine of claim 10, further comprising an image processor for storing the first set of sheet image data and the second set of sheet edge data from said charge coupled devices.

12. The printing machine of claim 11, further comprising a user interface device for modifying the sheet image data and the sheet edge data.

13. The printing machine of claim 8, wherein the first optically detectable pattern comprises a first set of spatially compact parallel lines and wherein the second optically detectable pattern comprises a second set of spatially compact parallel lines.

14. The printing machine of claim 8, wherein said producing means moves said sensor to scan the sheet and said platen in a first direction and a second direction, substantially perpendicular to the first direction.

* * * * *